United States Patent [19]
Tennyson et al.

[11] Patent Number: 5,806,901
[45] Date of Patent: Sep. 15, 1998

[54] BUMPER SYSTEM

[75] Inventors: David Tennyson, Newmarket; Pat Berube, Aurora; Walter Dzuryk, Niagara-on-the-Lake; Claude Riendeau, Boisbrand, all of Canada

[73] Assignee: D.T. Motorsport Inc., Markham, Canada

[21] Appl. No.: 627,155

[22] Filed: Apr. 3, 1996

[51] Int. Cl.⁶ .................................................. B60R 19/04
[52] U.S. Cl. ........................ 293/136; 293/122; 293/126
[58] Field of Search .................................. 293/102, 122, 293/126, 127, 130, 132, 135, 136; 114/219; 405/212, 214, 215; 267/139, 140; 213/220, 221, 222, 223

[56] References Cited

U.S. PATENT DOCUMENTS

| | | |
|---|---|---|
| 1,347,937 | 7/1920 | Clary . |
| 1,407,783 | 2/1922 | Cissell ...................................... 293/135 |
| 1,439,209 | 12/1922 | Watson .................................... 293/136 |
| 1,640,320 | 8/1927 | Hanel ...................................... 293/130 |
| 1,664,989 | 4/1928 | Nickels . |
| 1,673,392 | 6/1928 | Caesar ..................................... 293/130 |
| 2,168,908 | 8/1939 | Lewis ...................................... 293/127 |
| 2,186,505 | 1/1940 | Tibbetts ................................... 293/126 |
| 2,329,808 | 9/1943 | Wolfe ...................................... 293/127 |
| 3,694,018 | 9/1972 | Levering ................................. 293/136 |
| 3,829,117 | 8/1974 | Park ....................................... 280/96.1 |

FOREIGN PATENT DOCUMENTS 621727  5/1927  France .

*Primary Examiner*—Sherman Basinger
*Attorney, Agent, or Firm*—Bereskin & Parr

[57] ABSTRACT

A bumper system for a go-kart has a plurality of bumper sections. The bumper section has a sufficient rigidity that displacement to one bumper section transmits motion to other bumper sections. A plurality of shock absorbers are provided, for example, rubber elements connected between the bumper sections and the frame. Consequently, impact at any one point is transmitted throughout the bumper system so that all the shock absorbers assist in absorbing the impact, rather than just the shock absorbers immediately adjacent the impact point. For the rear bumper system transverse motions guides are provided to support a rear bumper section, and to maintain the various bumper sections about a horizontal plane relative to the frame, while permitting the necessary horizontal motions, both longitudinally and laterally. The bumper sections may be connected together at their ends by pivots. Alternatively, the bumper sections may be continuous. The bumper sections may be formed from steel or a fibre reinforced composite material.

12 Claims, 10 Drawing Sheets

BUMPER SYSTEM

FIELD OF THE INVENTION

The present invention generally relates to bumper systems in general, and more particularly, to a bumper system for use with go-karts.

BACKGROUND TO THE INVENTION

A go-kart is commonly, a small or miniature racing car. Usually it has a steel or other frame and a lightweight body, often moulded from fiberglass or the like, attached. A go-kart is usually designed for one person and has a single, centrally located seat, and four small wheels with a diameter of the order of 6" and a width of the order of 5". The industry recognizes broad classes of go-karts, namely: performance racing karts, which typically have a lightweight body, a gasoline powered engine with a power of, for example, 25 horsepower, and which are intended to be driven by experienced drivers in sanctioned events or races; concession karts, which typically are heavier, of the order of 300 to 400 pounds, are powered by a gasoline engine of, for example, 5.5 h.p., and are intended for rental to the general public; and more recently hybrid karts intended for rental to the public, but providing a higher performance. Such hybrid karts may have a weight of the order of 180 pounds.

Go-karts are often defined by regulation, such as the Amusement Devices Act of the Province of Ontario. These recognize two basic categories, namely adult karts and kiddie karts, defined by the maximum speed to which they are governed or limits and by the size of the driver. This Act also recognizes that a go-kart may have seats for two riders.

In this specification including the claims, reference to "Go-Kart" means a go-kart in accordance with any of the foregoing definitions, or as described in Regulation of any U.S. state or Canadian province.

Recreational go-karting and racing are popular pastimes in North America and abroad, and the industry is a fast growing one in the entertainment field. However, for safety reasons, the industry is usually regulated by the government. Among other things, there is typically a requirement that all go-karts used for amusement purposes must have bumpers which cover not only the front and rear of the go-kart, but also the sides. As well, there is typically the requirement that the wheels of the go-kart must be sufficiently protected so that they will not be susceptible to interlocking with the wheels of another go-kart thereby causing one or both go-karts to flip over, potentially injuring the occupants of the go-karts.

Further, by providing bumpers which protect the entire go-kart, the occupant of the kart will have at least some protection in the event of a collision with another go-kart, or a safety wall which typically surrounds the track on which the go-kart is run.

One known bumper system for go-karts often is made from a continuous spring steel band, which surrounds the kart. The band may have a width or height of between two to four inches. Although the bumper is continuous, it is separated into sections. This allows access to tires, brakes, steering, suspension etc. of the kart.

The bumper is mounted to the go-kart via resilient supports, which are made from "D" rubber. "D" rubber is a known rubber extrusion, which is extruded so as to have a "D" shaped or generally triangular profile. It is commonly used in continuous strips as a bumper or impact absorber on trucks. The "D" rubber is designed to act as a dampening material to help absorb any shock which the kart may experience during a collision or impact. The supports are provided at various points on the frame of the go-kart, where there is a high likelihood of collision. This includes the front and rear of the go-kart, the four corners of the go-kart, and along a portion of the sides of the kart. For a kiddie kart fewer supports are provided, due to the lower speeds and weights of the karts.

While this system does prevent the interlocking of wheels on two go-karts so that neither kart will flip over, it leaves much to be desired. In particular, as the bumper is a continuous strip of metal, which is fixed to the frame of the go-kart at numerous locations, mechanical servicing of the go-kart is cumbersome and time consuming. In order to service the go-kart, at least a portion of the bumper must be unbolted from the frame of the go-kart. This requires the removal and replacement of numerous bolts.

A further disadvantage of this system is that the elongate band is not very stiff. Consequently wherever an impact occurs, the energy and motion is absorbed just by adjacent resilient supports and is not transmitted around the kart. The supports do not provide for a great range of motion and individual supports cannot absorb much energy. Consequently, if the go-kart is subjected to a hard impact, as frequently occurs, there is still the potential for structural damage to the go-kart. The bumper system is inadequate to absorb the shock. If all of the shock is not absorbed by the supports mechanism, there is the likelihood of damage occurring to the go-kart, or worse yet, injury to the occupant of the go-kart. As well, because numerous supports are used to secure the bumper to the go-kart, flexing of the bumper itself is restricted, and if subjected to a hard impact, the bumper may undesirably be subjected to dents. This is all a result of the fact that the entire force experienced during an impact is absorbed at the site of the impact, and is not dissipated throughout the system.

SUMMARY OF THE INVENTION

In accordance with the present invention, there is provided a bumper system for a go-kart including a main frame, the bumper system comprising:

a plurality of bumper sections for mounting adjacent one another in a row around the main frame such that the bumper sections extend around at least two sides of the go-kart;

means for maintaining the plurality of bumper sections in position relative to the kart frame, while permitting horizontal motion thereof;

and a shock absorber means for mounting between each section and the go-kart main frame;

wherein the bumper sections are sufficiently rigid that displacement of one bumper section by an impact causes significant displacement of at least one adjacent bumper section, whereby the shock absorber means associated with those bumper sections all contribute to absorbing the impact.

The present invention provides a bumper system which has an increased ability to absorb shock experienced during an impact, by dissipating the shock throughout the entire bumper system and allowing shock absorbers placed around the go-kart to absorb the shock through compression, shear or tension forces. This is in contrast to present systems in which the shock of an impact is generally localized at the point of impact. Therefore, the present invention reduces the risk of structural damage to the go-kart or injury to the occupant of the go-kart during a collision.

The bumper system has a plurality, that is to say two or more, of bumper sections for extending around at least two sides of the go-kart. In this context, reference to "side" denotes either the front, rear, left hand side or right hand side of a go-kart frame.

In a preferred version of the bumper system, it provides a rear bumper system having three bumper sections, for extending around at least parts of the left and right hand sides of the main frame and around the rear of the frame. Forward ends of the side bumper sections are then adapted for pivotal connection to the main frame.

In one embodiment, the pivotal connections are provided between a rear bumper section and the left and right hand bumper sections. Alternatively, the bumper sections can be continuous and integral with one another. For this purpose, it is expected that they should be formed from a composite, fiber reinforced material, capable of providing considerable resiliency; however, this concept is yet to be proved.

Shock absorber means can comprise resilient rubber elements or the like, mounted between the frame and the bumper sections. The means for maintaining the bumper sections in position to the go-kart frame, that is in a constant horizontal plane relative to the frame, to prevent horizontal motion, can be either independent from the shock absorber means or integral therewith.

Another aspect of the present invention provides a bumper system for a go-kart comprising a forward bumper system adapted for mounting the forward end of a go-kart including a main frame, the bumper system comprising:

a bumper support member for securing to the main frame of the go-kart or the front thereof;

a forward bumper section connected at either end to the bumper support member;

means for maintaining the forward bumper section in position relative to the go-kart frame, while permitting horizontal motion thereof;

and shock absorber means mounted between the main frame and at least one of the bumper support member and the forward bumper section, wherein both the forward bumper section and the bumper support member are capable of resilient deflection in response to an impact on the forward bumper section.

In this forward bumper system, the forward bumper section can either be pivotally attached to the bumper support member, or intregal therewith. Again, where it is intregal, the relevant components are preferably formed from fiber reinforced composite material.

BRIEF DESCRIPTION OF THE DRAWINGS

These and other advantages of the present invention will be more fully and completely understood through a consideration of the following description taken together with the accompanying drawings of a preferred embodiment of the inventions in which.

DETAILED DESCRIPTION OF THE PREFERRED EMBODIMENT

Figure 1:
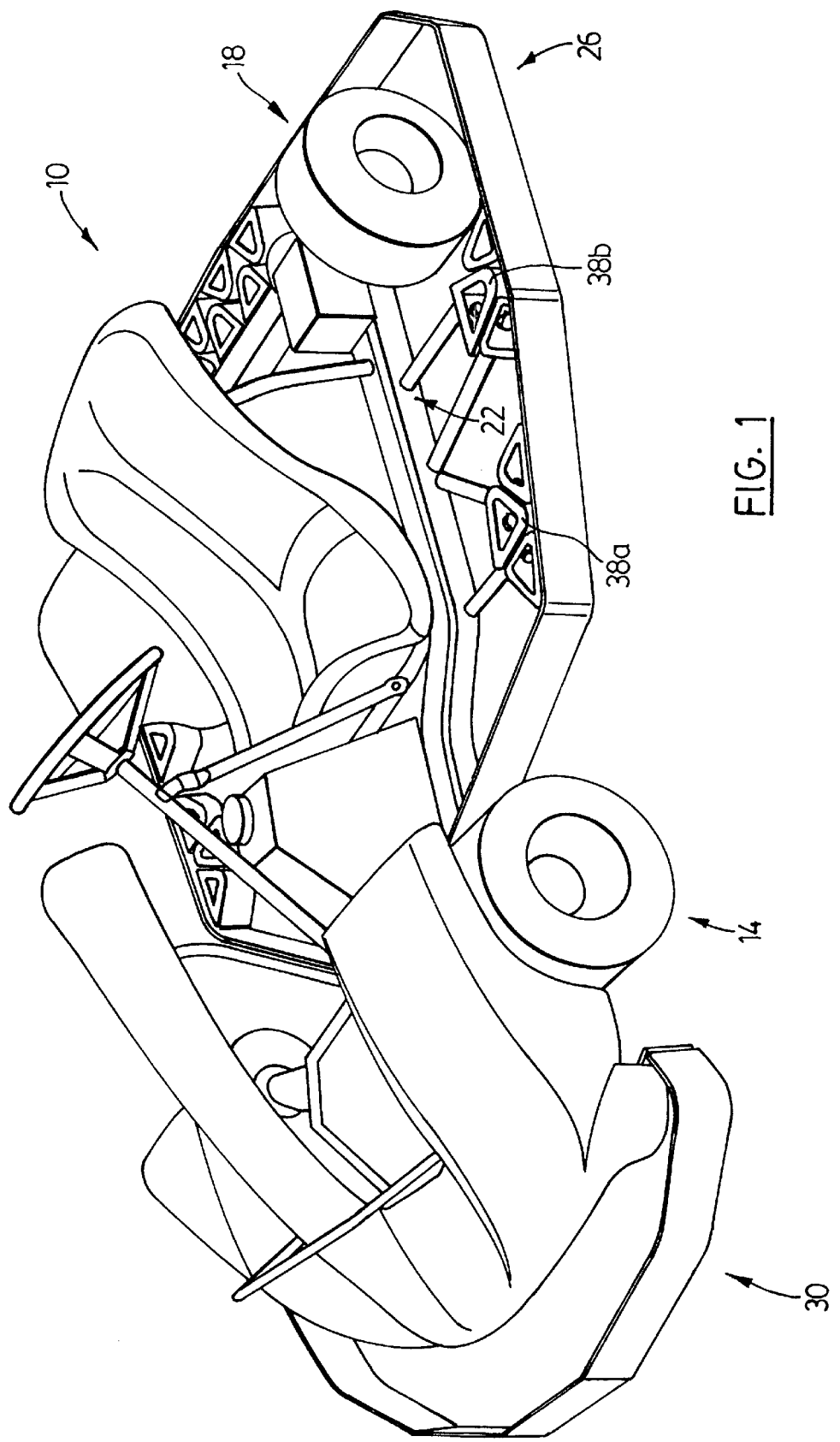
FIG. 1 is a perspective view of a preferred embodiment of a go-kart including a bumper system made in accordance with the present invention.

Referring now to FIG. 1, there is shown a go-kart in accordance with the present invention, generally indicated by reference numeral 10. The go-kart 10 has front wheels 14 and rear wheels 18, defining a longitudinal axis therebetween, a frame 22, a rear bumper system 26 located at the rear of go-kart 10, and front bumper system 30 located at the forward end of go-kart 10. The frame 22 may be any frame which is generally known in the art. Preferably, frame 22 is tubular and made from a strong material such as steel. In the preferred embodiment, frame 22 is made from 3140 chrome alloy steel, is tubular in nature, and has an outside diameter of 34 mm. Any suitable frame can be provided and details of the frame, apart from the mounting of the bumper systems, do not form part of the present invention.

Figure 2:
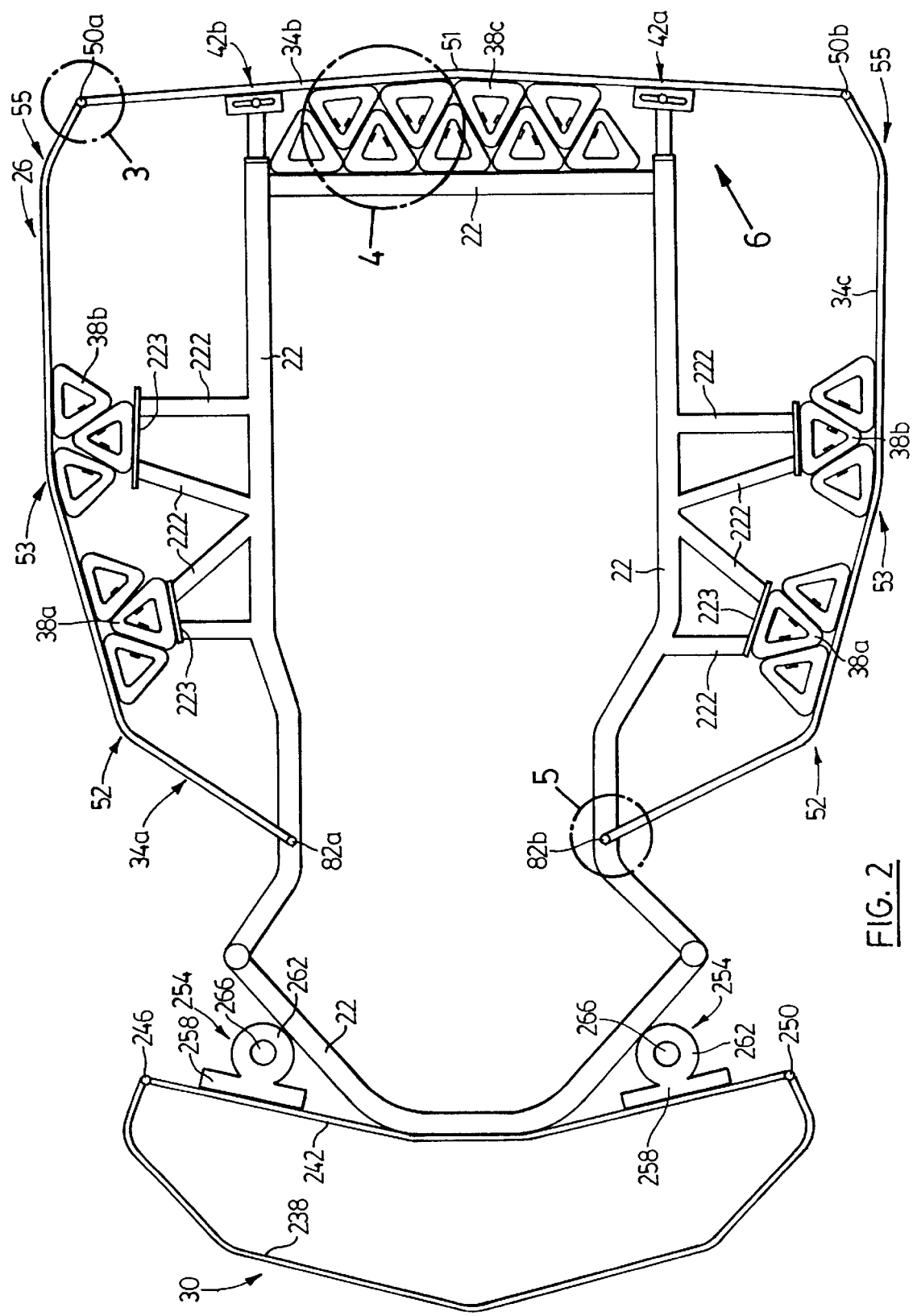
FIG. 2 is a top plan view of the bumper system of FIG. 1.

Referring now to FIG. 2, the rear bumper system 26 and the front bumper system 30 are provided to protect both the go-kart 10 and its occupant in the event of a collision with another go-kart or a safety wall. As such, the rear and front bumper systems 26, 30 need to be strong, flexible, and capable of absorbing any shock which is experienced on impact. The rear bumper system 26 has a rear bumper 34, shock absorbers 38, and transverse motion guides 42.

The rear bumper 34 surrounds the rearward portion of the go-kart 10 including the rear wheels 18, and comprises a right hand side bumper section 34a, a rear bumper section 34b and a left hand bumper section 34c. The bumper sections 34a, b, and c are made from a strong material (a chrome alloy which is heat treated to 40–44 Rockwell Hardness), which is has a certain flexibility and resiliency, and is preferably light weight. The individual sections 34a, b, and c while having a certain flexibility also have considerably rigidity. In this embodiment, the bumper sections 34a, b, and c are made from steel 5 mm in thickness, and have a height or depth of 3 inches. At least for steel, the bumper sections 34a, b and c have a coating 46 indicated schematically (as seen in FIGS. 3, 4, 5 and 6) on its exterior surface in order to decrease friction experienced during any collision. In this embodiment, the coating 46 is polyethylene. The polyethylene coating 46 may be applied in any known manner. For example, it may be in the form of a strip corresponding to the size of the bumper sections 34a, b, c. The polyethylene stripping may be fastened to the bumper sections 34a, b, c by an appropriate number of countersunk rivets (not shown). Alternatively, the polyethylene coating 46 may be applied by an encapsulation process.

The bumper sections 34 have a ground clearance of approximately 1.75 inches.

Alternatively, the bumper sections 34a, b and c may be made from Kevlar™. This saves weight and reduces impact inertia by lowering the total mass of the go-kart. Additionally, a Kevlar bumper does not require the polyethylene coating as does the steel bumper in order to reduce friction under side or glancing impacts. An alternative Kevlar bumper system will be described later herein.

The bumper sections 34a, b, and c are linked together by rear pivots 50a and 50b at the rear corners. The rear bumper section 34b comprises a symmetrical convex central bend 51 between pivots 50a and b. Each of the side bumper sections 34a, 34c has a sharp bend 52 at the front, a central bend 53 which is slight, and a rear bend 55 which is intermediate in size between the other two. These bends cause each bumper section 34a, b, and c to be bowed, somewhat like a leaf spring. This bowing enables them to act similar to springs, and allows them to spring freely on impact and return to their original form after the impact is absorbed, as will be discussed later.

Figure 3:
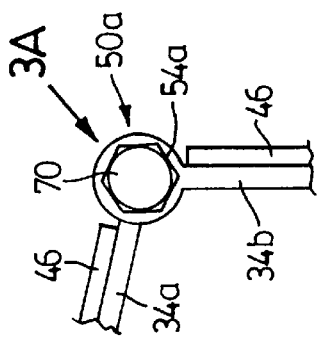
FIG. 3 is an enlarged top plan view of area 3 in FIG. 2.
Figure 3A:
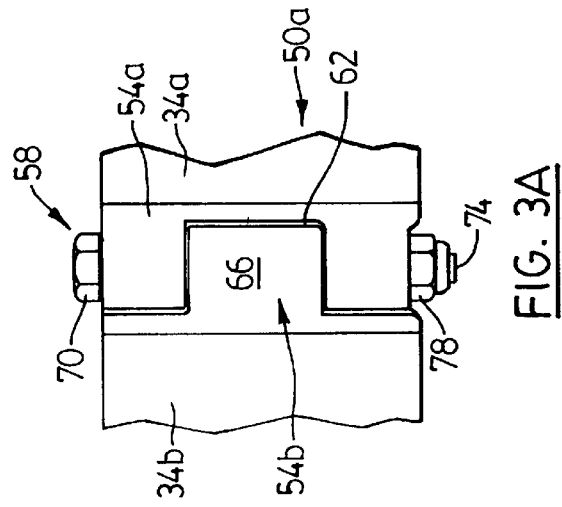
FIG. 3A is side elevational view taken in the direction of arrow 3A in FIG. 3.

The rear pivots 50a and b can best be seen in FIGS. 3 and 3A. Pivots 50a and b may be of any design which allows bumper sections 34a, b, and c to pivot with respect to each other. Reference will be made to pivot 50a which links bumper sections 34a and b. It will be appreciated that pivot 50b which links bumper sections 34b and c may be constructed in a manner similar to that which will be described.

Bumper sections 34a and b each terminate in cylindrical portions 54a and b adapted to receive a pivot pin 58. The cylindrical portion 54b, located on bumper section 34a, has a gap 62, and cylindrical portion 54b, located on bumper section 34b, has a protrusion 66. Gap 62 is of a size and shape to receive protrusion 66 therein. Cylindrical bores in the cylindrical portions 54a, b are of a size and shape to accommodate pivot pin 58, thus allowing bumper sections 34a and b to pivot easily with respect to each other about pin 58.

Pivot pin 58 may be of any known design. Here the pivot pin 58 is in the nature of a bolt (size 9/16), preferably a grade 8 quality bolt, and has head 70, and body portion 74. Head 70 is larger in diameter than the cylindrical bores of cylindrical portions 54a and b. The body 74 is externally threaded and has a nut 78 screwed thereon.

The rear bumper system 26 is pivotally connected to frame 22 at its forward ends by means of forward pivots 82a and b (FIG. 2). The forward pivots 82a and b are constructed in a manner similar to pivots 54a and b.

Figure 5:
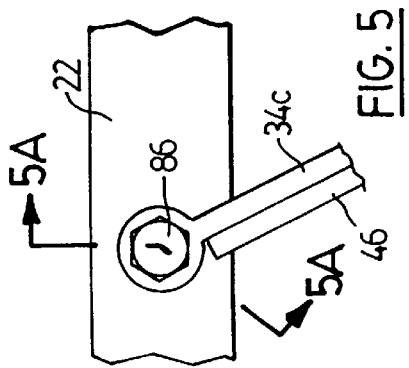
FIG. 5 is an enlarged top plan view of area 5 in FIG. 2.
Figure 5A:
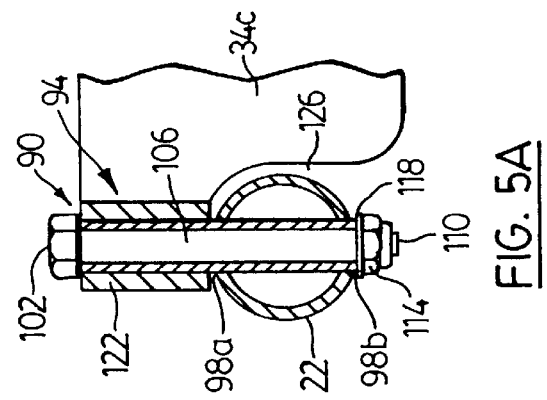
FIG. 5A is a cross-sectional view taken along the line 5A—5A in FIG. 5.

Referring now to FIGS. 5 and 5A, the front pivot 82b is shown in detail, and the other pivot 82a corresponds. The left hand bumper section 34c is pivotally mounted to frame 22 by a pin 86. The pin 86 extends through a vertical cylindrical bore 90 of flange 94 on the bumper section 34c, and frame 22 through openings 98a and b. As with pin 58, pin 86 likewise has head 102, body 106 and tail 110. A nut 114 is threaded onto tail 110 as previously described. In addition, a washer 118 may be provided to better secure the entire assembly. Alternatively, the pins 58 and 86 may be in the nature of rivets. However, a nut and bolt arrangement, makes it is easier to remove the rear bumper system 26 for servicing.

In order to improve the smoothness with which bumper section 34c will pivot with respect to frame 22, the interior surface 122 of cylindrical bore 90 of flange 94 may be lined with a low friction material such as nylon or polytetrafluorethylene. In the preferred embodiment, interior surface 122 has a nylon bushing, and this can also be provided for the rear pivots 50a, b.

As is best seen in FIG. 5A, by utilizing flange 94 to attach bumper section 34c to frame 22, a space 126 is provided which gives sufficient clearance between the lower portion of bumper section 34c and frame 22 during collisions or impacts, and to enable the desired pivotal action to occur.

Referring again to FIG. 2, transverse motion guides 42a and b are provided along the rear end of go-kart 10 to support rear bumper system 26, while permitting it to move in a direction transverse to the longitudinal axis of the go-kart. Also, the guides 42a and b allow bumper section 34b to be displaced towards the rear of go-kart 10, as well as allowing it to have some rotational movement therearound. As will be discussed subsequently, this allows the rear bumper system 26 to dissipate energy absorbed during a collision throughout the entire system, rather than having it localized at the point of impact.

Figure 6:
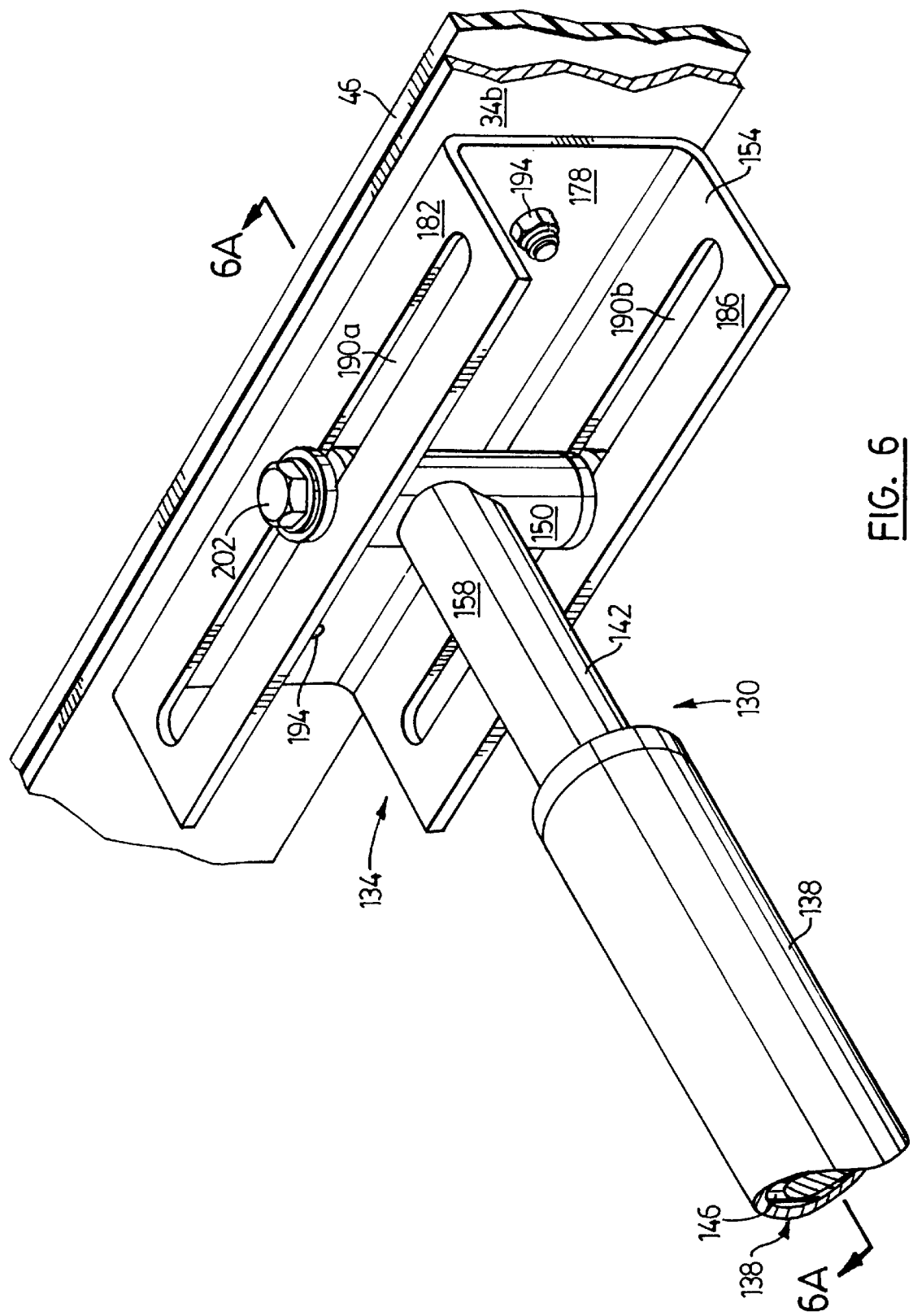
FIG. 6 is an enlarged perspective view taken in the direction of arrow 6 in FIG. 2.
Figure 6A:
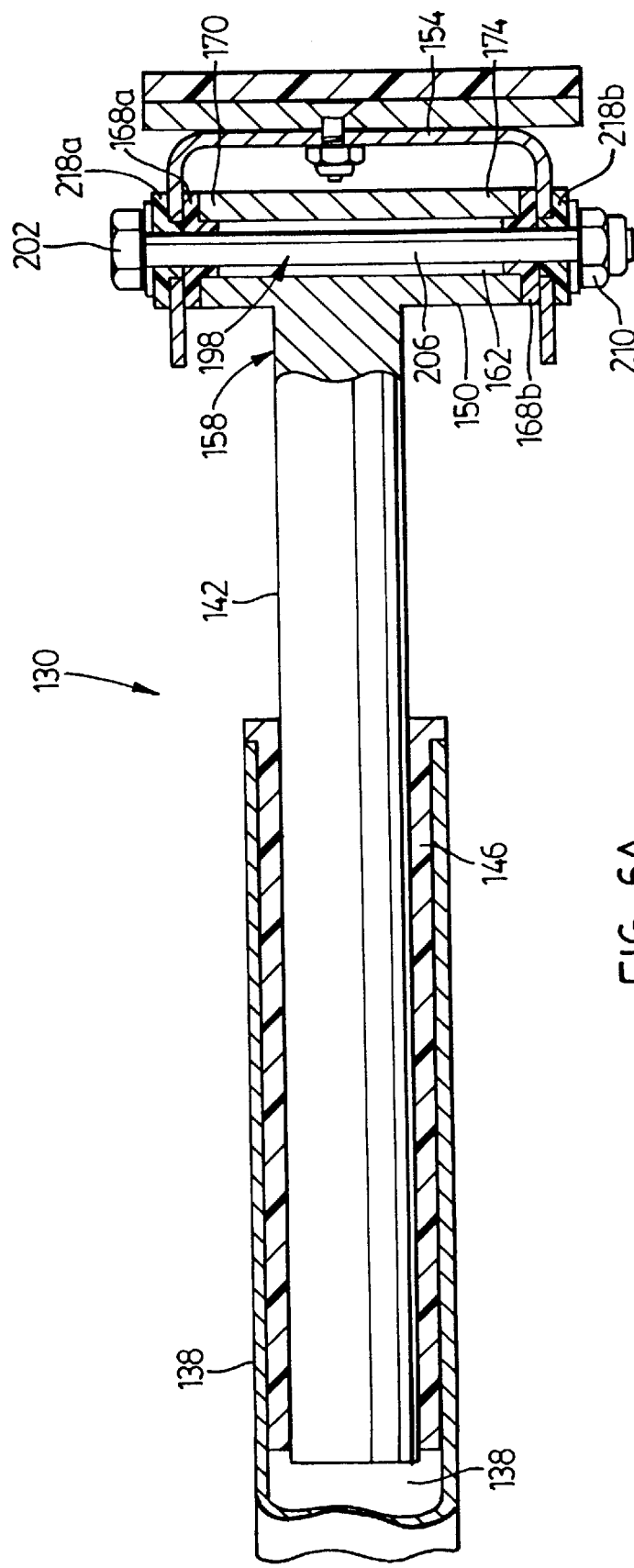
FIG. 6A is a cross-sectional view taken along the line 6A—6A in FIG. 6.

The transverse motion guides are generally similar and the guide 42a is best seen in FIGS. 6 and 6A. The transverse motion guides 42a and b connect the rear portion of frame 22 to the rear bumper section 34b. The transverse motion guide 42a comprises a piston assembly 130, and a slide assembly 134.

The piston assembly 130 comprises a cylinder 138 and a piston 142, and is mounted in a horizontal plane, with an axis parallel to the longitudinal axis of the go-kart 10. The piston 142 is of a size and shape corresponding to the interior portion of cylinder 138, allowing it to slide coaxially therein. That is, the outer diameter of piston 142 corresponds with the inner diameter of cylinder 138. Here, both the interior portion of cylinder 138 and piston 142 are cylindrical in shape. Preferably, the interior surface 146 of cylinder 138 is lined with a low friction material such as nylon or polytetrafluoroethylene (TEFLON™), and here interior surface 146 is lined with nylon, as can best be seen in FIG. 6A. This increases the ease with which piston 142 may slide within cylinder 134 (ie. acting like a shock absorber), and reduces wear on the respective parts.

Cylinder 138 is secured to frame 22 by any known means. Preferably, cylinder 138 is mounted to the underside of frame 22 by clamps or by a weld (not shown). This allows piston 142 to be compressed into cylinder 138 freely and without restriction without coming into contact with frame 22.

The slide assembly 134 comprises post 150, and bracket 154. Vertical post 150 is fixed to the external end 158 of piston 142. Post 150 is fixed to piston 142 by any means known in the art, such as welding for example. Preferably, the post 150 is integrally formed with piston 142. The post 150 is preferably cylindrical in shape, and has an interior cylindrical bore 162 coaxial therewith. Bushings 168a and b line the top and bottom openings 170 and 174 of post 150. Bushings 168a and b are made from nylon. The bushings 168a and b preferably extend a small distance into hollow portion 162, and also cover the top and bottom of post 150.

The bracket 154 is provided to attach the rear bumper section 34b to transverse motion guide 42a. The bracket 154 is U-shaped in cross section, and has a rear wall 178, top wall 182 and bottom wall 186. The top and bottom walls 182 and 186 are in parallel horizontal planes, and are set apart a distance slightly larger than the distance between the bushings 168a and 168b. Each of the top and bottom walls 182 and 186 has an elongate slot 190a and b respectively, which extends longitudinally therein. The bracket 154 is secured to the bumper section 34b by any known means, and is preferably secured with nut and bolt arrangements 194 at either end, as seen in FIG. 6A.

A pin 198 secures the bracket 154 to post 150, and has a head 202, and a body 206 which extends through slot 190a, bushing 168a, hollow portion 162, bushing 168b and slot 190b, thereby securing the rear bumper section 34b to the piston assembly 130. The nut 210 is internally threaded and adapted to be screwed onto the body of pin 198. Washers 218a and b are preferably provided between head 202 and bracket 154, and between nut 210 and bracket 154 respectively. In the preferred embodiment, washers 218a and b and bushings 166a and b are made from nylon. Nut 210 is tightened such that post 150 may slide within slots 190 when wall 34 is subjected to an impact, and includes a locking arrangement to prevent it working loose.

As will be appreciated, the transverse motion guides 42a and b allow the rear bumper section 34b to compress towards the rear of go-kart 10, slide transversely to the longitudinal axis of go-kart 10, and to pivot a limited degree about post 150. It is essential that the slide arrangement 134 is provided within the transverse motion guides 42a and b, so that shearing forces on the piston assembly 126 are eliminated. If the slide assembly was not provided, a side impact would likely subject the piston assembly 130 to shearing forces strong enough to cause significant damage through metal fatigue and resulting in failure of the parts.

The bushings 168a and b reduce friction between the bracket 154 and the post 150, and allow for smooth unrestricted motion for a wide range of motion transverse to the longitudinal axis of the go-kart.

In order to provide a bumper system which can effectively dampen the shock experienced during an impact, shock absorbers 38 are provided. The shock absorbers 38 may be any material or device which provides both a resilient spring effect and a dampening effect, to absorb the impact energy. For example, shock absorbers 38 may be made from D rubber, as is shown in FIG. 2. The height of the shock absorbers 38 is the same as that of the bumper sections 34a, b, and c. Alternatively, shock absorbers 38 may be made from corrugated Kevlar™. They may alternatively comprise discrete springs and separate shock or damping elements.

The shock absorbers 38 are placed at various positions around go-kart 10, between the frame 22 and the bumper 34. The shock absorbers 38 are provided along the rear of go-kart 10, and along each side. Along the sides, the shock absorbers 38 are spaced from frame 22 of go-kart 10 by arms 222. Arms 222 are preferably made from steel, and are joined to frame 22 by standard welding techniques or clamps (not shown). Mounting plates 223 are welded to the ends of the arms 222, and the shock absorbers 38 are secured to the plates 223.

Figure 4:
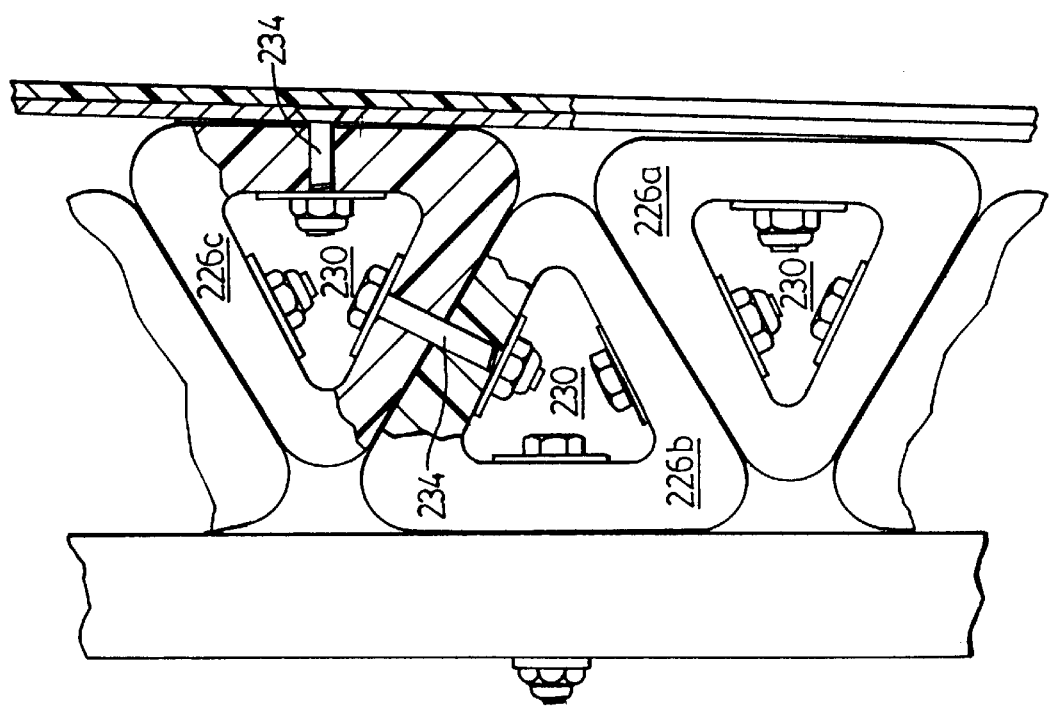
FIG. 4 is an enlarged top plan view of area 4 in FIG. 2.

Referring now to FIG. 4, there is shown one method of joining shock absorbers 38 to arms 222 and bumper 34, which is generally applicable to all the shock absorbers. Individual triangular pieces of D rubber 226a, b, c, . . . are placed in alternating orientation, and secured together. The D rubber defines an interior cut out 230, which increases the shock absorbing capabilities of the individual rubber pieces 226. After being subjected to a shock, the individual rubber pieces 226 will naturally return to their original shape.

The individual rubber pieces 226 are also slightly offset from each other. This further increases the collective shock absorbing capabilities of the shock absorbers 38 as a whole. This is particularly so when exposed to side impact forces (ie. shearing forces). The shock absorbers 38 at each location may be formed as one integral unit, for example utilizing an extrusion process, or on an individual basis. As seen in FIG. 4, if individual rubber pieces 226 are used to form shock absorbers 38, they may be secured together by bolts 234. In addition, shock absorbers 38 are also secured to both the frame 22 by the mounting plates 223, and the bumper 34 by bolts 234. In a known manner for rubber materials, large washers are also provided. However, in the interest of time and costs, not to mention weight factors, it is preferable to form the shock absorbers 38 by an extrusion process. For example, the entire group of shock absorbers 38 along the rear of go-kart 10, between the transverse motion guides 42a and b, could be extruded as one piece. Other shock absorber configurations could then be cut from this shape.

Along each side there are two groups of shock absorbers 38, designated 38a for a forward group on each side and 38b for a rearward group on each side. Each of the groups 38a, 38b comprises three triangular pieces of the D rubber 226. As shown, these are arranged with one rubber piece 226 bolted to a respective mounting plate 223, and with two outwardly facing pieces of the rubber 226 bolted to a respective one of the bumper sections 34a, 34c.

For the rear, a rear shock absorber assembly 38c comprises nine pieces of the rubber 226, arranged with 5 bolted to the frame 22 and 4 bolted to the rear bumper section 34b.

It will be appreciated that the shock absorbers 38 are capable of resiliently deflecting in any direction in a horizontal plane. The transverse motion guides 42a, b ensure that only horizontal motion occurs.

Figure 10:
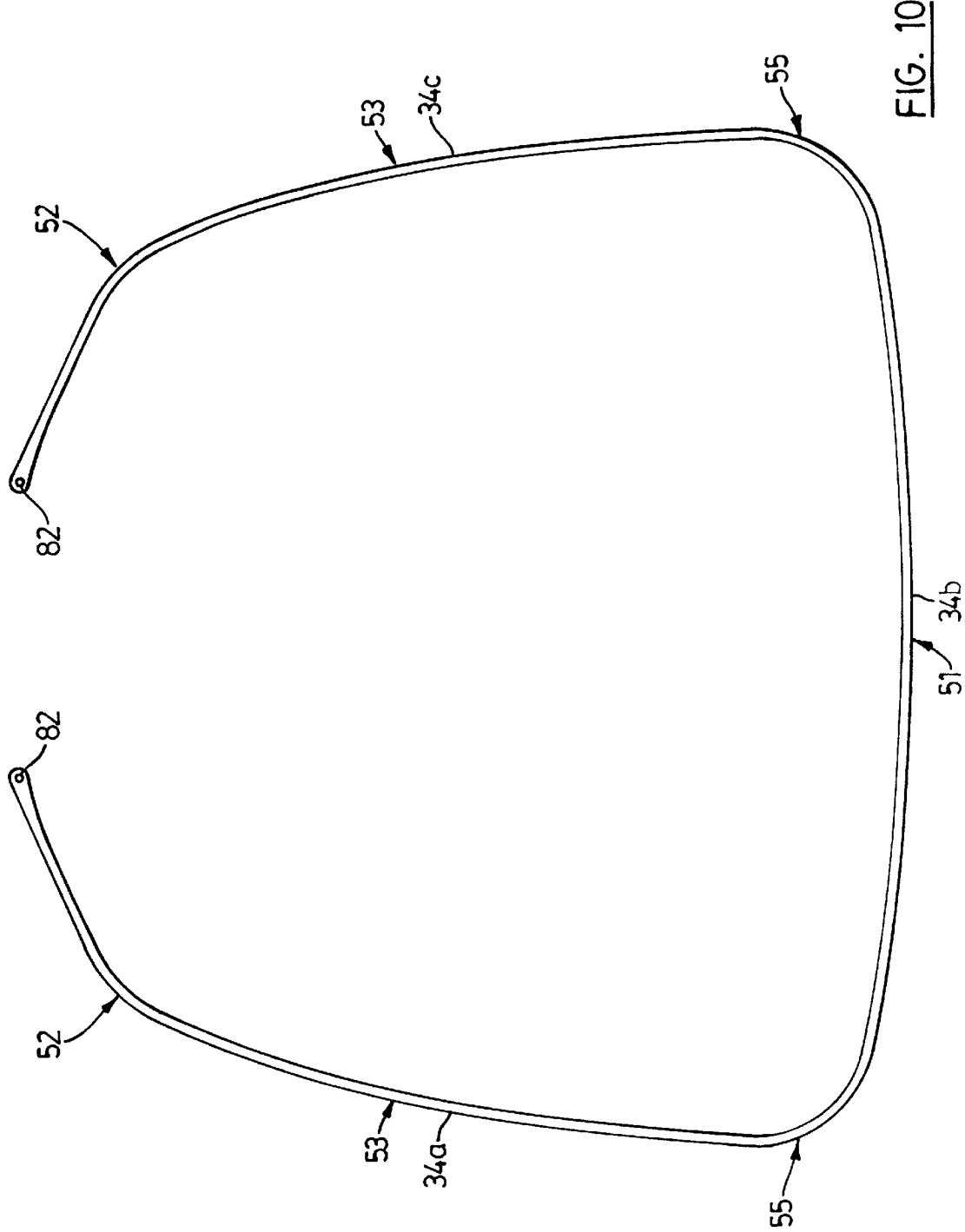
FIG. 10 is a top plan view of an alternative embodiment of a rear bumper system made in accordance with the present invention.

Referring now to FIG. 10, there is shown an alternative embodiment of the rear bumper system 26 (with the frame 22, shock absorbers 38, transverse motion guides 42 and arms 222 omitted). In this embodiment, bumper 34 is made from Kevlar™. It will be appreciated that bumper 34 has the same basic characteristics as the steel bumper system previously described. However, due to the high strength, flexibility and resiliency of Kevlar, it is not necessary to provide a plurality of bumper sections 34a, b and c with connecting pivots 50a and b. Instead, the bumper 34 may be of unitary construction, as shown in FIG. 10.

Here, the bumper 34 is pivotally attached to the frame of the go-kart (not shown) by pivots 82a and b. The pivots 82a and b may be constructed and used to pivotally attach the bumper 34 to the frame of the go-kart in the same manner as previously described for the steel system.

Bumper 34 has left hand side 34a, rear side 34b and right hand side 34c. Each of the left and right hand sides 34a and c has a sharp bend 52 at the front, a central bend 53 which is slight, and a rear bend 55 which is intermediate in size between the other two. The rear side 34b has a central bend 51.

It will be appreciated that the use of Kevlar in the construction of the bumper 34 is essentially the same as that described previously when the bumper 34 is made from steel. The key difference is that because of the increased strength, flexibility and resiliency of Kevlar over steel, the need for pivots 50a and b joining a plurality of bumper sections 34a, b and c is eliminated. Shock absorbers 38 (not shown) are provided between the bumper 34 and the frame 22 (not shown) in the same manner as the steel system.

Figure 7:
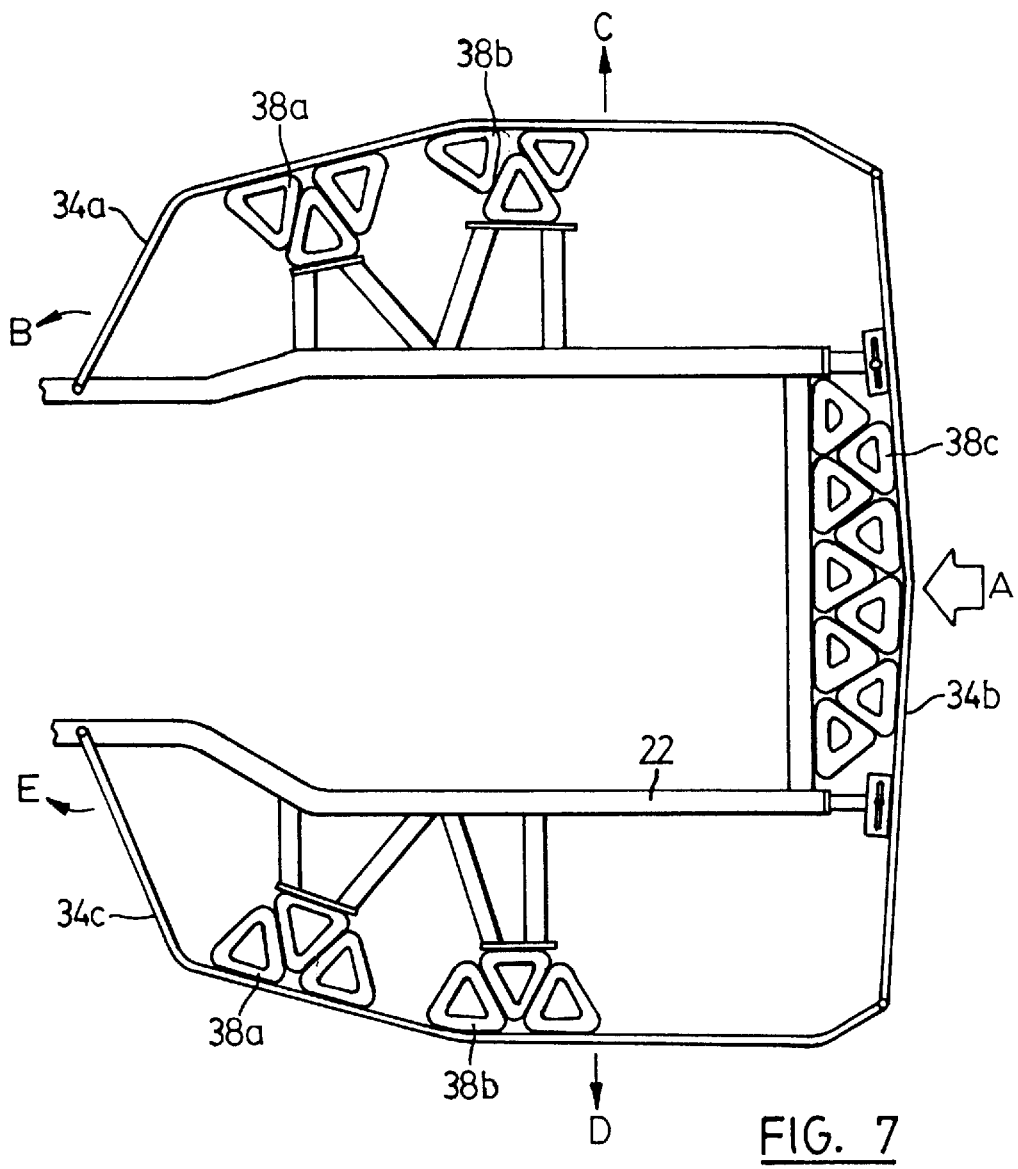
FIG. 7 is a top plan view of the rear bumper system in FIG. 2, showing the results of a rear impact.
Figure 8:
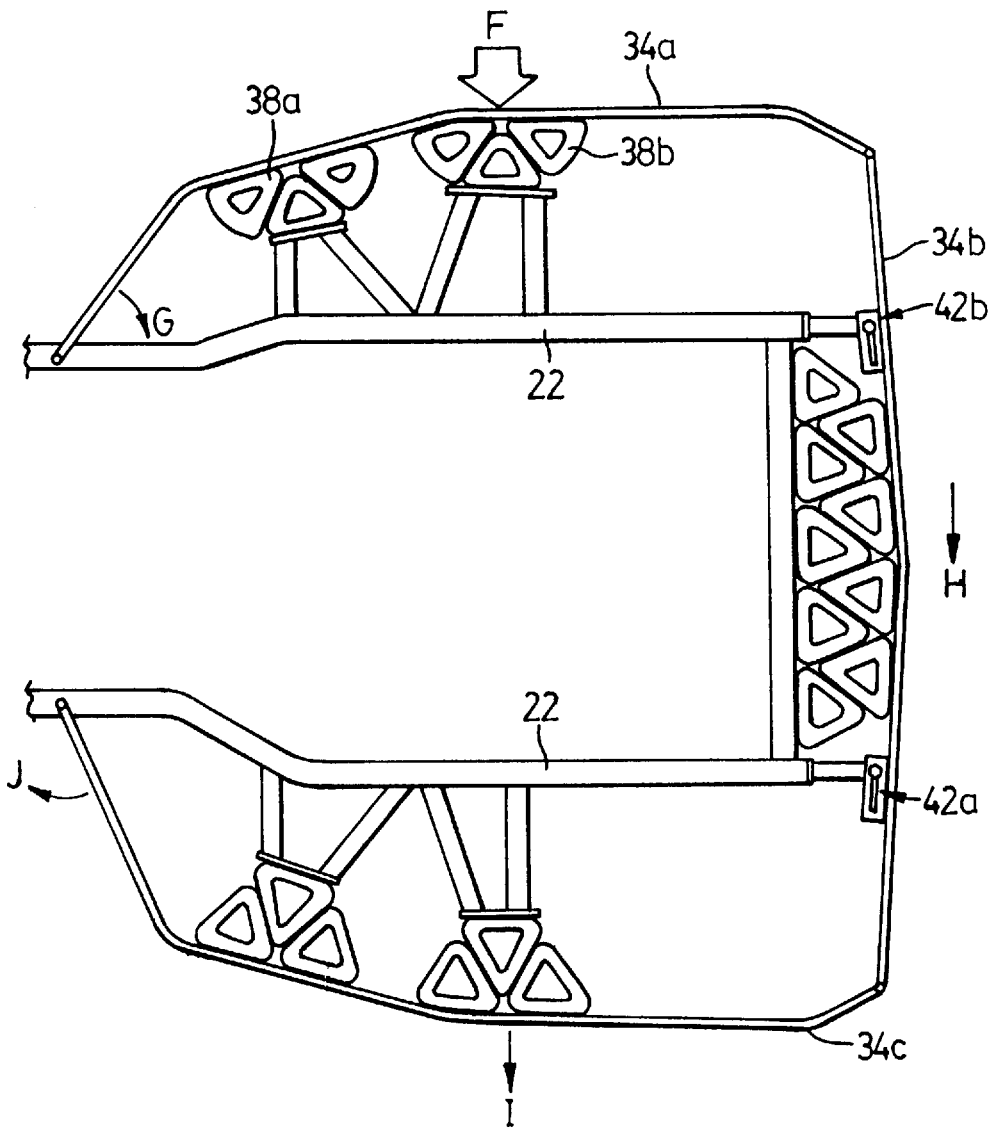
FIG. 8 is a top plan view of the rear bumper system in FIG. 2, showing the results of a side impact.
Figure 9:
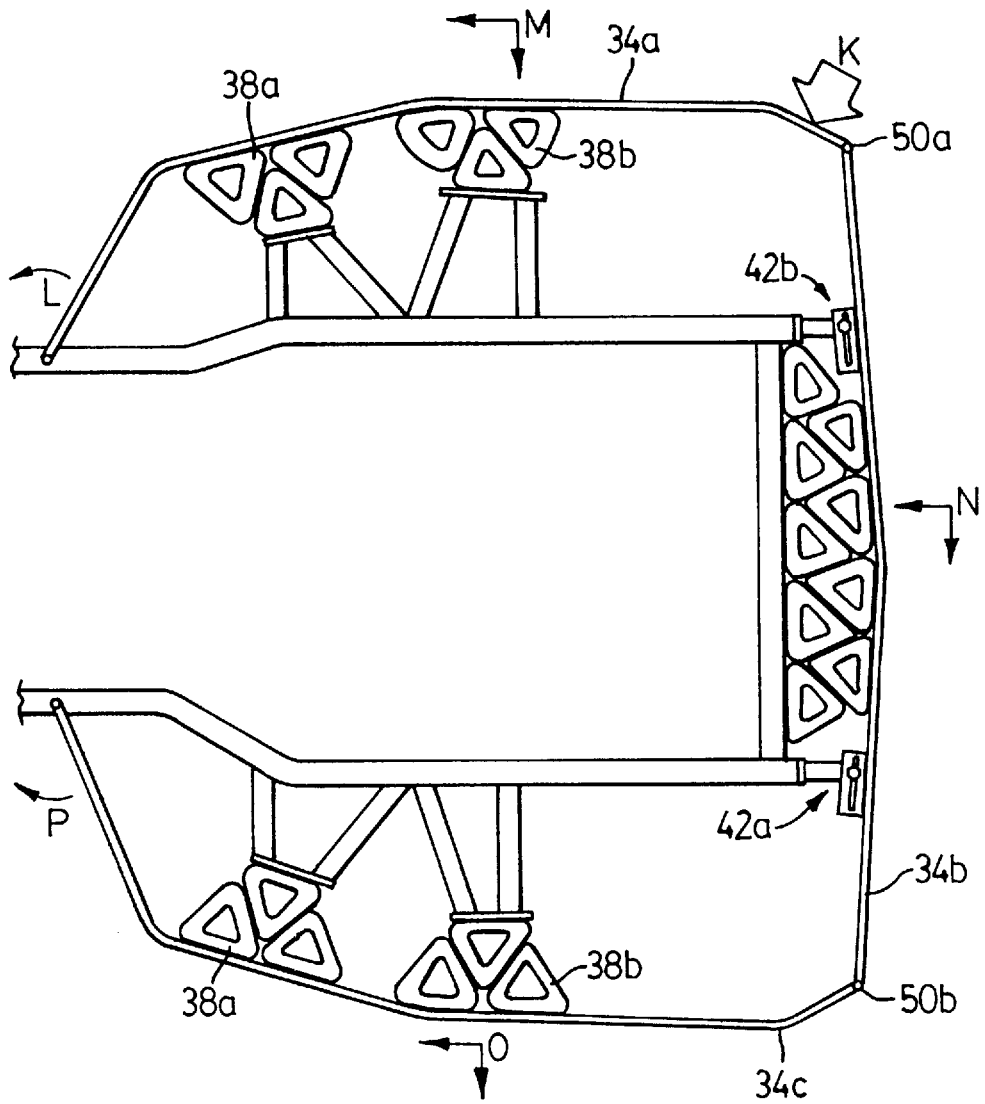
FIG. 9 is a top plan view of the rear bumper system in FIG. 2, showing the results of a rear corner impact.

Referring now to FIGS. 7, 8 and 9, it will be seen how the rear bumper system 26 absorbs the localized shock experienced during a collision and dissipates the energy throughout the entire bumper system, thereby softening the blow during a collision and reducing the risk of structural damage to the go-kart or injury to the occupant of the go-kart.

Referring to FIG. 7, there is shown the effects of a "rear end" collision; that is, where the go-kart 10 is struck from directly behind, indicated by arrow A. In this situation, the rear bumper section 34b is displaced towards the rear end of go-kart 10. The rear shock absorber assembly 38c compresses and absorbs a large portion of the impact. The piston assemblies 130 also retract to the same extent as the shock absorbers 38.

Unlike known designs, the rear bumper section 34b has considerable rigidity. Hence its outer ends are also displaced forward, although flexing of the bumper 34b will reduce this motion to some extent.

Through pivots 50a, b this causes the side bumper sections 34a and c to bulge outwardly from frame 22 and also towards the front of go-kart 10 (as shown by arrows B, C, D, and E). Thus, the side groups of shock absorbers 38a, b are extended outwardly away from the go-kart, and at the same time towards the front of the go-kart. Therefore, the shock of a localized impact at the rear of the kart is shared among all shock absorbers on the go-kart through compression, stretching and shearing forces, and not just the ones located at the rear.

Similarly, FIG. 8 shows the effects of a side impact on the bumper system, from the direction indicated by arrow F. In this collision, right hand bumper section 34a is subjected to a direct impact. The shock absorber 38a, b on the right hand side absorb a large portion of the energy of the impact, as the bumper section 34a is displaced towards frame 22. However, the shock is again dissipated throughout the rest of rear bumper system 26 as is shown by arrows G, H, I and J. Again the bumper section 34a is sufficiently rigid that is rearward end causes the rear bumper section 34b to be displaced transversely across the rear of go-kart 10. In turn this displaces the pivot 50b causing the left hand bumper section 34a to move outwardly away from frame 22, (arrow I); there may also be additional motion as indicated by arrow J. This movement is allowed because of transverse motion guides 42a and b. Therefore, the shock of the impact is again absorbed by all shock absorbers 38, either through compression (right hand shock absorber groups 38a,b), shear (rear shock absorber assembly 38c) or through stretching (left hand shock absorber groups 38a,b). Thus, the shock of the impact is dissipated throughout the entire bumper system, rather than being localized at the point of impact.

Finally, the effect of a rear corner impact can be seen in FIG. 9. In the case, the collision occurs from the direction indicated by arrow K, and the entire rear bumper system 26 absorbs the impact as shown by the arrows L, M, N, O, P and Q. As in the previously described collisions, the shock of the collision is dissipated throughout the rear bumper system 26 and absorbed by shock absorbers 38 through compression, stretching and shearing forces.

Here, the pivot 50a is displaced both transversely and forwardly. As indicated by the arrow M, this causes the right hand bumper section 34a to be moved forwardly and to compressed or bowed. The right hand groups of shock absorbers 38a,b will be subject to both shear and tension.

For the rear, as indicated by arrow N, the rear shock absorber assembly 38c is subject to compression and shear. Again, the transverse motion guides 42 permit both lateral displacement and forward motion of the rear bumper section 34b.

On the left hand side, this motion is again transmitted throughout the pivot 50b, causing forward and lateral motion indicated by arrows O. As in all impacts, the bumper sections have some flexibility so that the full range of motion will not be experienced on the left hand side. Nonetheless the left hand side shock absorber groups 38a, b will be both extended laterally and subject to shear in a forward direction.

A front bumper system 30 may be constructed in a similar manner to that described for rear bumper system 26 (FIG. 2). In the preferred embodiment, front bumper system 30 has front bumper 238 and a supporting member 242. The front bumper 238 and supporting member 242 are joined at pivots 246 and 250. Pivots 246 and 250 may be constructed in the same manner as pivots 50a and b. The front bumper 238 is preferably somewhat semi-circular or bowed outwardly from frame 22, so that it may act as a leaf spring. Rear supporting member 242 is also somewhat bowed in the same direction as front wall 238, although to a much lesser extent.

Rear supporting member 242 is secured to frame 22 by any known means, such as a nut and bolt arrangement (not shown). Shock absorbers 254 are also provided to increase the shock absorbing capabilities of front bumper system 30. Shock absorbers 254 are provided at both ends of rear wall 242, and are located between rear wall 242 and frame 22. The shock absorbers 254 have a flat portion 258, and a cylindrical portion 262. The flat portions 258 of shock absorbers 254 are fixed to rear wall 242 with bolts or other securing means (not shown). Cylindrical portion 262 preferably rests against frame 22, and has a cut out hollow section 266. Hollow section 266 increases the shock absorbing capabilities of front bumper system 30. If it is desired to increase the stiffness of front bumper system 30, a solid material such as steel cylinder may be inserted into hollow section 266.

The front bumper system 30 is preferably made from the same material as rear bumper system 26, and likewise also has a polyethylene coating on the exterior surface of walls 238 and 242. The front bumper 238 and rear supporting member 242 may be made from steel which is 8 mm in thickness, and 3 inches in height. Also, the front bumper system 30 has a ground clearance of 1.75 inches.

Figure 11:
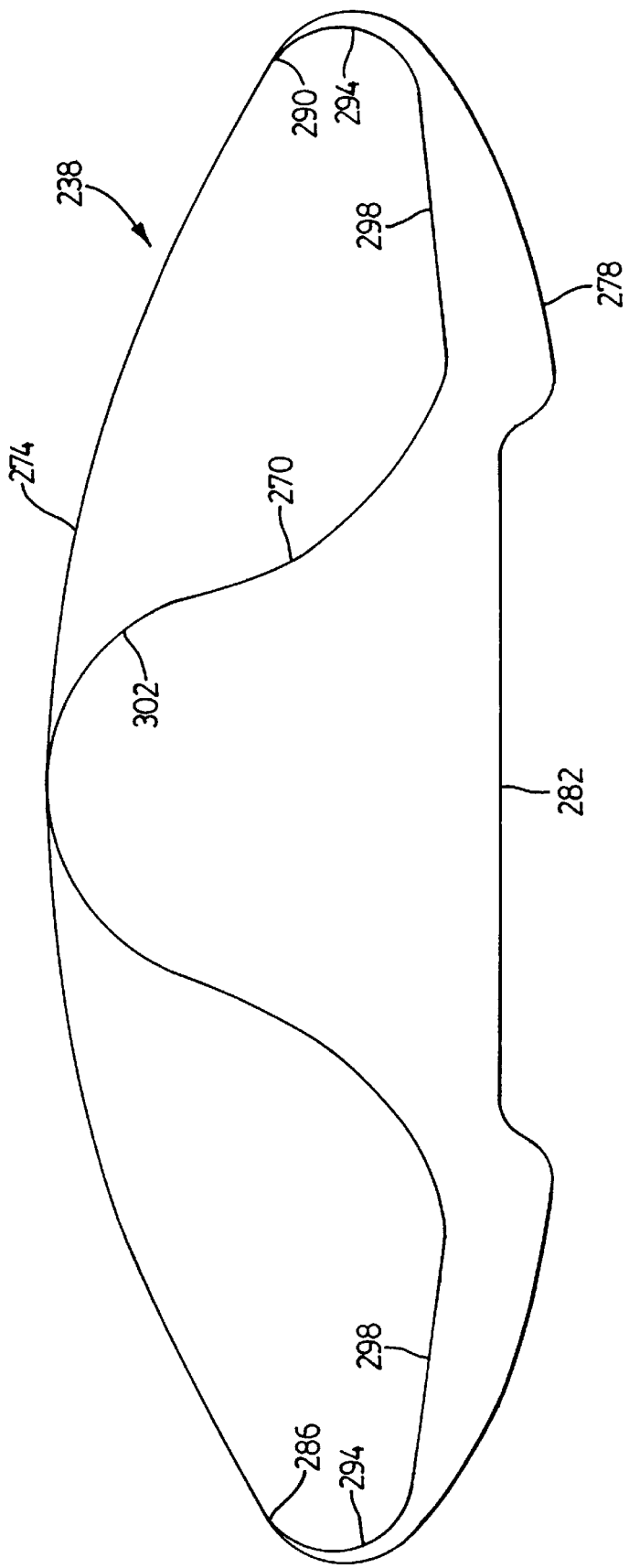
FIG. 11 is a top plan view of an alternative embodiment of a front bumper system made in accordance with the present invention.

Referring now to FIG. 11, there is shown an alternative embodiment for the front bumper system 30 (with the go-kart frame 22 and shock absorbers 254 omitted). In this embodiment, the front bumper system 30 comprises a bumper 238 and a shock absorbing member 270.

Bumper 238 is generally oval in shape and has a forward section 274 and a rearward section 278. The rearward section 278 has a generally straight indentation 282 centrally located therein. The bumper 238 is attached to the frame 22 by a bolt assembly similar to that described for the steel bumper system. The bolt assembly is located within in the indentation 282. The bumper 238 is constructed from epoxy Kevlar which is 0.5 inches in thickness, although it may be any thickness which is strong, flexible and resilient enough to effectively act as a bumper. As with the steel bumper system, the bumper 238 has a height of 3 inches, and a ground clearance of 1.75 inches.

The shock absorbing member 270 is also made from Kevlar which is ⅜ of an inch in thickness. The shock absorbing member 270 is located in the interior space defined by the bumper 238, and joined at either end 286 and 290 to the outer portion of forward section 274 of bumper 238. The shock absorbing member 270 may be joined to the forward section 274 of the bumper 238 by any known means. In the preferred embodiment, the shock absorbing member 270 is joined to the forward section 274 of bumper 238 by an epoxy adhesive (aviation epoxy). This provides a very strong yet flexible joint which will not crack or break under stress. Shock absorbing member 270 has two sharply curved outer sections 294, two shallow intermediate generally concave sections (back to front) 298, and a sharp central convex section (back to front) 302. Convex section 302 extends forward so that it comes into contact with the interior of forward bumper section 274.

The Kevlar bumper system used in connection with the present invention is commercially available epoxy impregnated Kevlar (pre-preg) which gives excellent strength and flexibility to the bumper system.

As with the steel bumper system described, rubber shock absorbers 254 (not shown) may also be provided. When this embodiment of the front bumper system is used, because of the strength and flexibility of Kevlar, pivots 246 and 250 are not needed to connect the bumper section with the support member. Instead, they may be integrally formed. However, bumper 238 still acts in the same manner as with the steel bumper system.

The addition of shock absorbing member 270 increases the overall effectiveness of the front bumper system. The shock absorbing member 270, because of its shape, acts as a spring which is biased to absorb any impact experienced by the front bumper system, and subsequently return bumper 238 to its original position. As well, the shock absorbing member 270 reinforces the bumper 238 to give it additional strength.

The embodiments of FIGS. 10 and 11 show bumper systems formed from lightweight composite materials. Due to the significant weight savings possible, these designs are attractive. However, their effectiveness and durability have yet to be proven.

It will be appreciated that various changes may be made within the spirit of the described invention, and all such changes are within the scope of the appended claims. In particular, although a particular mounting arrangement and particular former shock absorber has been shown for the rear bumper system, various different mountings and springs or shock absorbers can be used. For example, discrete springs and damping or shock absorbing elements could be used.

For the rear bumper system, the key is the provision of three separate bumper sections, each of which has significant rigidity and which are maintained in position relative to the go-kart frame, while permitting horizontal motion. This enables an impact at any one point to be transferred to adjacent areas of the bumper system. If a different shock absorber system is used from that described, then it may be possible to dispense with or modify the transverse motion guides 42. The main function of the motion guides 42 is to support the bumper sections 34 and maintain rear bumper system 26 in a uniform horizontal plane relative to the frame 22.

We claim:

1. A bumper system for mounting to a main frame, the bumper system comprising:

a plurality of resilient bumper sections for mounting connected to one another in series to form a row around the main frame such that the bumper sections extend around at least two sides of the main frame, the row of bumper sections including ends for attachment to the main frame;

guide means for maintaining the plurality of bumper sections in position vertically relative to the main frame, while permitting horizontal motion thereof;

shock absorber means for mounting between each section and the main frame for providing resilient bowing for each section;

wherein the bumper sections include a plurality of pivot connections and the bumper sections are sufficiently rigid that displacement of one bumper section by an impact causes significant displacement of at least one adjacent bumper section, whereby the shock absorber means associated with those bumper sections all contribute to absorbing the impact.

2. A bumper system as claimed in claim 1, wherein the pivot connections are located at the connections between the bumper sections.

3. A bumper system as claimed in 2, adapted for fitting to the main frame, the bumper system comprising left and right hand bumper sections, each of which includes a forward pivotal attachment to the main frame, and a rear bumper section connected at either end to rear ends of the left and right hands of the bumper sections.

4. A bumper system as claimed in claim 3, which includes transverse motion guides secured to the rear bumper section and for connection to the main frame, which permits longitudinal and transverse motion and at least some rotational motion of the rear bumper section.

5. A bumper system as claimed in claim 4, wherein the guide means includes transverse motion guides for connection to the main frame, each of which permits, within limits, unrestrained longitudinal and transverse motion of the bumper system relative to the main frame.

6. A bumper system as claimed in claim 4 or 5, wherein each shock absorber comprises a resilient material and has a generally uniform cross-section in a vertical direction and includes a plurality of webs extending between an outside surface and inside surface of the shock absorber, the outside surface being secured to a respective bumper section, and the inside surface being for connection to the main frame, the webs being spaced apart to define apertures which permit the flexing of the webs.

7. A bumper system as claimed in any one of claims 3, 4, 5 or 2 wherein the bumper sections are formed from a fibre-reinforced composite material.

8. A bumper system as claimed in claim 1, wherein the pivot connections are located at joints between the bumper sections at the ends of the row, and the main frame.

9. A bumper system as claimed in claim 3, wherein the pivot connections between the main frame and the bumper sections are mounted inwardly in relation to the pivot connections between the bumper sections.

10. A bumper system as claimed in claim 3 or 9, wherein the left and right hand bumper sections are curved outwardly to promote outward bowing on impact.

11. A bumper system as claimed in claim 1, 3 or 4 in combination with a go-kart.

12. A bumper system as claimed in claim 1, 3 or 4, wherein the shock absorber means are capable of deflecting resiliently in any direction in a horizontal plane.

* * * * *